(12) United States Patent
Tammisetti et al.

(10) Patent No.: US 12,133,287 B1
(45) Date of Patent: Oct. 29, 2024

(54) TRANSPOSITIONAL MODULATION FORTIFIED COMMUNICATIONS TRAFFIC MANAGEMENT

(71) Applicant: TM IP HOLDINGS, LLC, Tucson, AZ (US)

(72) Inventors: Mohan Tammisetti, Tucson, AZ (US); Daniel Hodges, Tucson, AZ (US)

(73) Assignee: TM IP HOLDINGS, LLC, Tucson, AZ (US)

( * ) Notice: Subject to any disclaimer, the term of this patent is extended or adjusted under 35 U.S.C. 154(b) by 247 days.

(21) Appl. No.: 17/836,945

(22) Filed: Jun. 9, 2022

Related U.S. Application Data

(63) Continuation-in-part of application No. 17/751,470, filed on May 23, 2022, which is a continuation-in-part
(Continued)

(51) Int. Cl.
*H04L 27/00* (2006.01)
*G01S 7/00* (2006.01)
(Continued)

(52) U.S. Cl.
CPC .............. *H04W 8/22* (2013.01); *G01S 7/003* (2013.01); *G01S 13/765* (2013.01); *H04W 8/005* (2013.01); *H04L 27/0012* (2013.01)

(58) Field of Classification Search
CPC .... H04B 3/54; H04B 1/30; H04B 1/28; H04L 25/4902; H04L 1/0009; H04L 1/0041; H04L 25/49; H04L 1/0003; H04L 1/0071; H04L 5/0007; H04L 27/0008; H04L 27/2647; H04L 1/20; H04N 5/4401; H04W 8/22; H04W 8/005; G10S 7/003; G01S 13/765
(Continued)

(56) References Cited

U.S. PATENT DOCUMENTS

| 3,968,486 A | 7/1976 | Gerdes |
| 4,259,888 A | 4/1981 | Gross |

(Continued)

FOREIGN PATENT DOCUMENTS

| TW | 201742414 | 12/2017 |
| WO | WO2014145868 | 9/2014 |
| WO | WO2017184743 | 10/2017 |

OTHER PUBLICATIONS

U.S. Appl. No. 16/436,381, filed Jun. 10, 2019.
(Continued)

*Primary Examiner* — Zewdu A Kassa
(74) *Attorney, Agent, or Firm* — HAYES SOLOWAY P.C.

(57) ABSTRACT

A method and system for traffic management of transpositional modulation fortified communications includes at least one transpositional modulation (TM) channel having a TM signal with a quantity of data. The at least one TM channel with TM signal does not exceed a spectral mask of an original carrier of an RF channel. The TM signal is transmitted between two locations and through at least one of a plurality of access points. At least one access traffic steering and splitting rule is implemented with a traffic management module, wherein a transmission path of the TM signal is, at least in part, controlled by the access traffic steering and splitting rule.

20 Claims, 5 Drawing Sheets

300

At least one transpositional modulation (TM) channel has a TM signal with a quantity of data, wherein the at least one TM channel with TM signal does not exceed a spectral mask of an original carrier of an RF channel. — 302

The TM signal is transmitted between two locations through at least one of a plurality of access points. — 304

At least one access traffic steering, switching, and splitting (ATSSS) rule is implemented with a traffic management module to control a transmission path of the TM signal, wherein ATSSS rule is executed on a computer processor. — 306

Related U.S. Application Data of application No. 16/436,381, filed on Jun. 10, 2019, now Pat. No. 11,343,670, which is a continuation of application No. 15/880,753, filed on Jan. 26, 2018, now Pat. No. 10,321,304, which is a continuation of application No. 15/655,380, filed on Jul. 20, 2017, now Pat. No. 9,883,375, which is a continuation of application No. 15/367,482, filed on Dec. 2, 2016, now Pat. No. 9,716,997, which is a continuation of application No. 15/133,589, filed on Apr. 20, 2016, now Pat. No. 9,516,490.

(51) Int. Cl.
| | |
|---|---|
| *G01S 13/76* | (2006.01) |
| *H04W 8/00* | (2009.01) |
| *H04W 8/22* | (2009.01) |

(58) Field of Classification Search
USPC .................. 375/260, 259, 219, 295, 316
See application file for complete search history.

(56) References Cited

U.S. PATENT DOCUMENTS

| | | | |
|---|---|---|---|
| 4,301,415 | A | 11/1981 | McFayden |
| 4,318,055 | A | 3/1982 | Hopwood et al. |
| 4,342,245 | A | 8/1982 | Gross |
| 4,584,534 | A | 4/1986 | Lijphart et al. |
| 4,613,974 | A | 9/1986 | Vokac et al. |
| 4,680,633 | A | 7/1987 | Gerdes et al. |
| 4,803,705 | A | 2/1989 | Gillingham et al. |
| 4,989,219 | A | 1/1991 | Gerdes et al. |
| 5,021,786 | A | 6/1991 | Gerdes |
| 5,124,706 | A | 6/1992 | Gerdes |
| 5,155,672 | A | 10/1992 | Brown |
| 5,165,017 | A | 11/1992 | Eddington et al. |
| 5,184,218 | A | 2/1993 | Gerdes |
| 5,200,715 | A | 4/1993 | Gerdes et al. |
| 5,200,822 | A | 4/1993 | Bronfin et al. |
| 5,327,237 | A | 7/1994 | Gerdes et al. |
| 5,511,100 | A | 4/1996 | Lundberg et al. |
| 5,557,333 | A | 9/1996 | Jungo et al. |
| 6,522,697 | B1 | 2/2003 | Spickermann |
| 6,559,757 | B1 | 5/2003 | Deller et al. |
| 6,788,154 | B2 | 9/2004 | Maneatis |
| 7,813,433 | B2 | 10/2010 | Moffatt |
| 7,856,050 | B1 | 12/2010 | Wiss et al. |
| 8,537,952 | B1 | 9/2013 | Arora |
| 9,014,293 | B2 | 4/2015 | Gerdes |
| 9,194,946 | B1 | 11/2015 | Vacanti |
| 9,516,490 | B1 | 12/2016 | Gerdes et al. |
| 9,716,997 | B1 | 7/2017 | Gerdes et al. |
| 9,883,375 | B2 | 1/2018 | Gerdes et al. |
| 2003/0074684 | A1 | 4/2003 | Noon |
| 2004/0247041 | A1 | 12/2004 | Biedka et al. |
| 2004/0252531 | A1 | 12/2004 | Cheng et al. |
| 2005/0030160 | A1 | 2/2005 | Goren et al. |
| 2005/0065901 | A1 | 3/2005 | Diong |
| 2005/0114663 | A1 | 5/2005 | Cornell et al. |
| 2005/0200391 | A1 | 9/2005 | Steinbach et al. |
| 2006/0006914 | A1 | 1/2006 | Fan-Jiang |
| 2006/0197564 | A1 | 9/2006 | Yen |
| 2007/0084920 | A1 | 4/2007 | Slatter et al. |
| 2007/0277035 | A1 | 11/2007 | Patel et al. |
| 2008/0041485 | A1 | 2/2008 | Anagnostopoulos |
| 2009/0007246 | A1 | 1/2009 | Gutowski et al. |
| 2009/0088077 | A1 | 4/2009 | Brown et al. |
| 2010/0111225 | A1 | 5/2010 | Kroeger |
| 2010/0203854 | A1 | 8/2010 | Yu et al. |
| 2011/0043039 | A1 | 2/2011 | Mancebo de Castillo Fagola |
| 2012/0155344 | A1 | 6/2012 | Wiley et al. |
| 2012/0171963 | A1 | 7/2012 | Tsfaty |
| 2013/0010955 | A1 | 1/2013 | Lu et al. |
| 2013/0244594 | A1 | 9/2013 | Alrabadi et al. |
| 2015/0023456 | A1 | 1/2015 | Vann et al. |
| 2015/0092621 | A1 | 4/2015 | Jalloul et al. |
| 2015/0237460 | A1 | 8/2015 | Goyal et al. |
| 2016/0013831 | A1 | 1/2016 | Lea et al. |
| 2016/0173302 | A1* | 6/2016 | Gerdes .................. H04L 27/10 375/295 |
| 2017/0093811 | A1 | 3/2017 | Dolev et al. |
| 2017/0325085 | A1 | 11/2017 | Gerdes et al. |
| 2017/0373403 | A1 | 12/2017 | Watson |
| 2018/0124048 | A1 | 5/2018 | Yoo |
| 2018/0152833 | A1 | 5/2018 | Gerdes et al. |
| 2018/0176134 | A1 | 6/2018 | Liu et al. |
| 2019/0372822 | A1 | 12/2019 | Woodsum |
| 2021/0350197 | A1 | 11/2021 | Chow |

OTHER PUBLICATIONS

U.S. Appl. No. 15/880,753, filed Jan. 26, 2018.
U.S. Appl. No. 15/655,380, filed Jul. 20, 2017.
U.S. Appl. No. 15/367,482, filed Dec. 2, 2016.
U.S. Appl. No. 15/133,589, filed Apr. 20, 2016.
EP Search Report in European Application No. 17786562.3, dated Apr. 1, 2019, 11 pages.
International Search Report and Written Opinion for International Application No. PCT/US 2017/028381, mailed Aug. 17, 2017, 7 pages.
International Search Report and Written Opinion for International Application No. PCT/US2024/011676, mailed May 16, 2024, 9 pages.
International Search Report and Written Opinion for International Application No. PCT/US2024/014316, mailed May 13, 2024, 13 pages.
International Search Report and Written Opinion for International Application No. PCT/US2023/085262, mailed May 9, 2024, 17 pages.
International Search Report and Written Opinion for International Application No. PCT/US2024/23903, mailed Aug. 5, 2024, 10 pages.
Alwan H, Agarwal A. A Multipath Routing Approach for Secure and Reliable Data Delivery in Wireless Sensor Networks. International Journal of Distributed Sensor Networks. 2013;9(3). doi: 10.1155/2013/232798.

* cited by examiner

TRANSPOSITIONAL MODULATION FORTIFIED COMMUNICATIONS TRAFFIC MANAGEMENT

CROSS REFERENCE TO RELATED APPLICATION

This application is a continuation-in-part application of U.S. patent application Ser. No. 17/751,470, filed May 23, 2022, which is a continuation-in-part application of U.S. patent application Ser. No. 16/436,381 filed on Jun. 10, 2019, which is a continuation application of U.S. patent application Ser. No. 15/880,753, filed on Jan. 26, 2018, now U.S. Pat. No. 10,321,304, which is a continuation application of U.S. patent application Ser. No. 15/655,380, filed on Jul. 20, 2017, now U.S. Pat. No. 9,883,375, which is a continuation application of U.S. patent application Ser. No. 15/367,482, filed on Dec. 2, 2016, now U.S. Pat. No. 9,716,997, which is a continuation of U.S. patent application Ser. No. 15/133,589, filed on Apr. 20, 2016, now U.S. Pat. No. 9,516,490, which are hereby incorporated by reference in their entirety.

FIELD OF THE DISCLOSURE

The present disclosure is generally related to RF signal transmission and more particularly is related to transpositional modulation fortified communications traffic management.

BACKGROUND OF THE DISCLOSURE

Radio frequency (RF) sinusoidal waveforms are transmitted from one location to another to convey data. When an RF wireless waveform is transmitted, it often goes through transformations within different aspects of the transmitter, receiver, and/or transceiver, as the case may be. For example, noise, often referred to as white Gaussian noise, is added to the transmitted signal, and when received, the receiver will receive both the original signal and the noise together. For digital communications, various components are used to transmit the original signal and receive the original signal with noise added, and then separate the noise from the original signal to obtain the underlying data of the original signal.

It is common to use modulation techniques with RF signals, where information is added to the original signal. For instance, carrier modulation techniques are used to transmit information signals from one location to another. Traditional signal modulation techniques include, for example, amplitude modulation (AM), frequency modulation (FM), phase modulation (PM). In addition, complex modulation techniques exist that incorporate aspects of AM, FM, and PM such as quadrature phase shift keying (QPSK), amplitude phase shift keying (APSK) and including quadrature amplitude modulation (QAM). While these modulation techniques exist, they fall short of meeting the current and future needs of wireless signal transmission.

Thus, a heretofore unaddressed need exists in the industry to address the aforementioned deficiencies and inadequacies.

SUMMARY OF THE DISCLOSURE

Embodiments of the present disclosure provide a system for traffic management of transpositional modulation fortified communication. Briefly described, in architecture, one embodiment of the system, among others, can be implemented as follows. At least one transpositional modulation (TM) channel has a TM signal with a quantity of data, wherein the at least one TM channel with TM signal does not exceed a spectral mask of an original carrier of an RF channel. The TM signal is transmitted between two locations through at least one of a plurality of access points. A traffic management module implements at least one access traffic steering and splitting rule, wherein a transmission path of the TM signal is, at least in part, controlled by the access traffic steering and splitting rule.

In one aspect of the system, the at least one TM channel utilizes sidebands within the spectral mask.

In another aspect of the system, the plurality of access points includes at least one of: a 5G access point, a 4G access point, a WiFi access point, or a satellite access point.

In yet another aspect of the system, the plurality of access points includes: a 5G access point, a 4G access point, a WiFi access point, and a satellite access point.

In another aspect of the system, the TM signal is transmitted between at least one of the plurality of access points and a user plane module.

In this aspect of the system, the user plane module includes an access traffic steering and splitting rules module, wherein the access traffic steering and splitting rules module implements the at least one access traffic steering and splitting rule.

In another aspect of the system, the TM signal is received at a receiver, wherein: when the receiver comprises a non-TM receiver, wherein the quantity of data is obfuscated; and when the receiver comprises a TM receiver, the quantity of data received is not obfuscated.

The present disclosure can also be viewed as providing methods for traffic management of transpositional modulation fortified communication. In this regard, one embodiment of such a method, among others, can be broadly summarized by the following steps: providing at least one transpositional modulation (TM) channel having a TM signal with a quantity of data, wherein the at least one TM channel with TM signal does not exceed a spectral mask of an original carrier of an RF channel; transmitting the TM signal between two locations through at least one of a plurality of access points; and implementing at least one access traffic steering and splitting rule with a traffic management module to control a transmission path of the TM signal, wherein the access traffic steering and splitting rule is executed on a computer processor.

In one aspect of the method, the at least one TM channel utilizes sidebands within the spectral mask.

In another aspect of the method, the plurality of access points includes at least one of: a 5G access point, a 4G access point, a WiFi access point, or a satellite access point.

In yet another aspect of the method, the plurality of access points includes: a 5G access point, a 4G access point, a WiFi access point, and a satellite access point.

In another aspect, the method further comprises transmitting the TM signal between at least one of the plurality of access points and a user plane module.

In this aspect, the user plane module includes an access traffic steering and splitting rules module, wherein the access traffic steering and splitting rules module implements the at least one access traffic steering and splitting rule.

In another aspect, the method further comprises the step of receiving the TM signal with a receiver, whereby: the quantity of data is obfuscated when the receiver comprises a non-TM receiver; and the quantity of data received is not obfuscated when the receiver comprises a TM receiver.

The present disclosure can also be viewed as providing methods for traffic management of transpositional modulation fortified communication. In this regard, one embodiment of such a method, among others, can be broadly summarized by the following steps: providing an original carrier of an RF channel operating within a spectral mask, wherein the original carrier has a carrier signal with a first quantity of data; adding at least one transpositional modulation (TM) channel having a TM signal with a second quantity of data to the original carrier thereby generating a TM fortified carrier signal having the first and second quantities of data, wherein the at least one TM channel with TM signal and carrier signal do not exceed the spectral mask of the original carrier; transmitting the TM fortified signal from a first location and through at least one of a plurality of access points; implementing at least one access traffic steering and splitting rule with a traffic management module to control a transmission path of the TM fortified signal through the at least one of the plurality of access points, wherein the access traffic steering and splitting rule is implemented with a computer processor; and receiving the TM fortified carrier signal on at least one device with a receiver.

In one aspect of the method, the at least one TM channel utilizes sidebands within the spectral mask.

In another aspect of the method, the plurality of access points includes at least one of: a 5G access point, a 4G access point, a WiFi access point, or a satellite access point.

In yet another aspect of the method, the plurality of access points includes: a 5G access point, a 4G access point, a WiFi access point, and a satellite access point.

In another aspect, the method further comprises transmitting the TM fortified signal between at least one of the plurality of access points and a user plane module, wherein the user plane module includes an access traffic steering and splitting rules module, wherein the access traffic steering and splitting rules module implements the at least one access traffic steering and splitting rule.

In yet another aspect of the method, the quantity of data is obfuscated when the receiver comprises a non-TM receiver; and the quantity of data received is not obfuscated when the receiver comprises a TM receiver.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve over conventional RF signal transmission and modulation techniques, the use of transpositional modulation (TM) techniques has been discovered to provide benefits with wireless RF transmission in terms of spectrum efficiency, private and obfuscated communications, and other benefits. TM is a RF waveform technology that can offer significant bandwidth increases for existing wireless and wired networks. These bandwidth increases are accomplished by enabling the simultaneous transmission of two or more distinct data paths on a single carrier signal, which effectively doubles the efficiency of the carrier wave. Moreover, the benefits of TM in radio communications provide a new method of carrier signal modulation and works as a foundational waveform.

Additionally, TM can provide for overlaying one type of modulation on top of another with very low, near zero, increases in interference or noise. TM has also been proven to function well with existing compression, encryption, or coding methods. This transparency is compatible even with complex modulations such as QAM, n-phase shift keying (n-PSK), and orthogonal frequency-division multiplexing (OFDM). Because of its transparency and ultra-efficient characteristics, TM allows the transmission of two or more signals simultaneously instead of one signal, as with other modulations, all without destroying the integrity of the individual bit streams.

Figure 1:
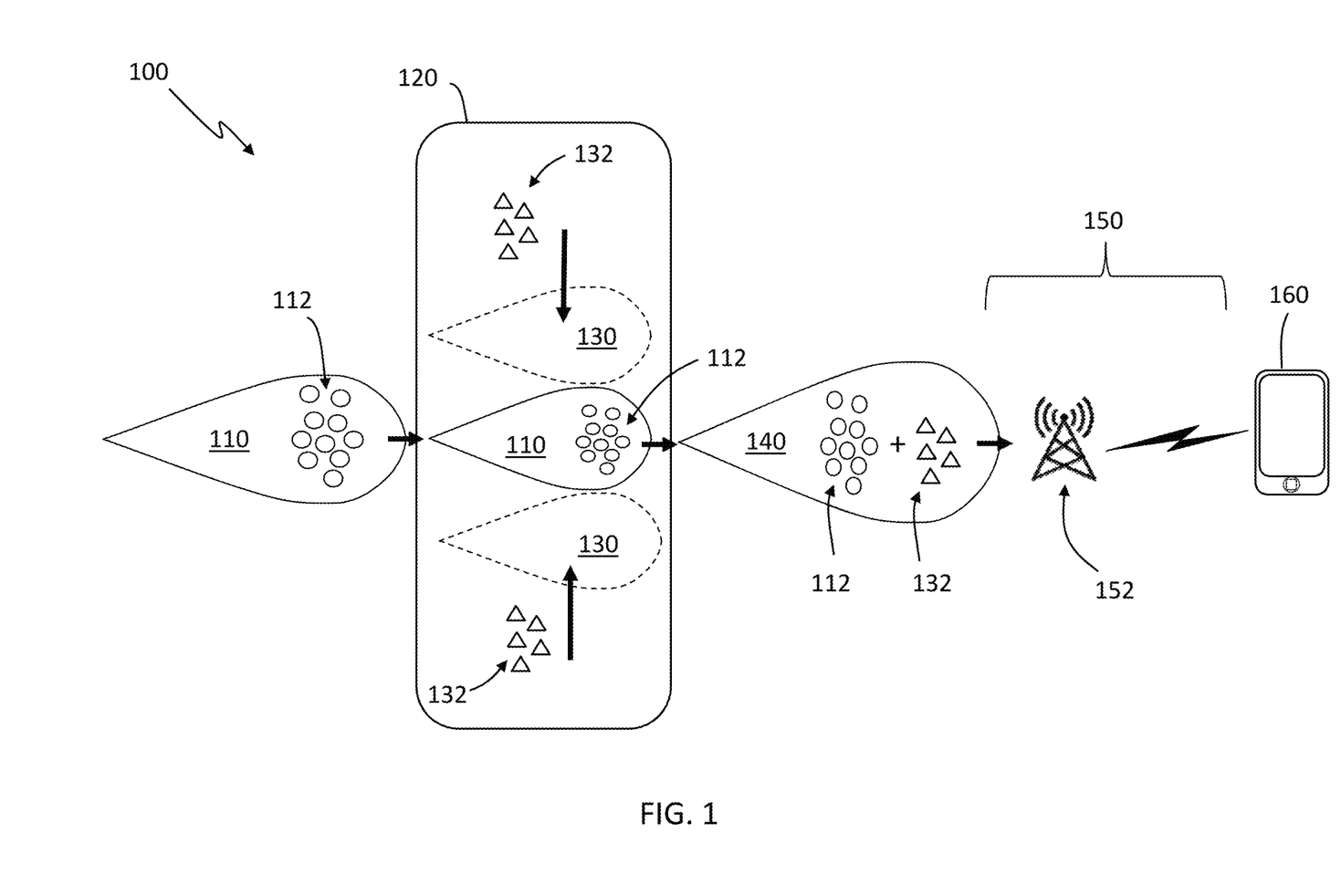
FIG. 1 is a diagrammatical illustration of a system for transpositional modulation fortified communication, in accordance with embodiments of the present disclosure.
Figure 2:
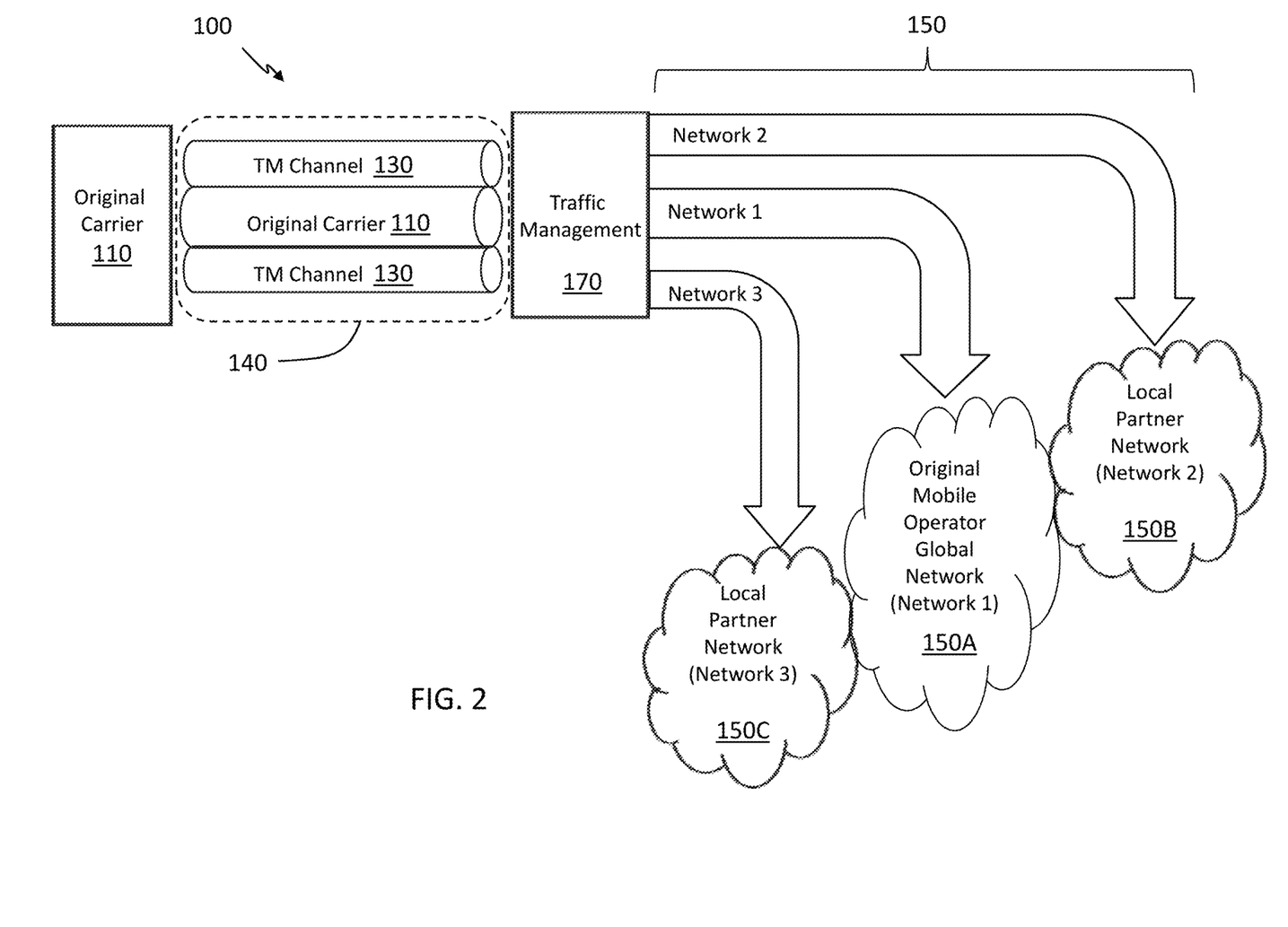
FIG. 2 is a diagrammatical illustration of the system for transpositional modulation fortified communication of FIG. 1 with a traffic management module, in accordance with embodiments of the present disclosure.

As background information about TM communications, FIGS. 1-2 illustrate systems of using TM fortified communication which can be used to increase the effective or usable bandwidth in a spectral mask, provide obfuscation of signal data, and other benefits to wireless communications.

FIG. 1 is a diagrammatical illustration of a system for transpositional modulation fortified communication 100, in accordance with embodiments of the present disclosure. The system for transpositional modulation fortified communication 100, which may be referred to herein simply as 'system 100' includes an original carrier 110 of an RF channel operating within a spectral mask 120. The original carrier 110 of the RF wireless channel has a carrier signal with a first quantity of data 112. The first quantity of data 112 may include any type of data, for instance, textual, visual, pictographic, videographic, encrypted, or other types of data which may be transmitted between electronic devices, such as computers, servers, cellular phones, or other computing devices. The original carrier 110 may move through a network system through various devices, processes, or iterations. For example, in digital communication, the information source may be transmitted on a channel, where various encoders, digital modulators, digital demodulators, receivers, channel decoders and receivers, and/or source decoders and receivers are used to process and transmit the signal.

The original carrier 110 operates within the spectral mask 120, within the spectrum, e.g., parameter or boundary of levels, of RF transmission for a particular communication protocol which is often defined by an organization such as the FCC, the ITU, or the ETSI, or another organization. The spectral mask 120 may be defined by different frequencies for various types of signals or communication protocols. For example, 4G communication networks commonly operate within 700 MHz-2500 MHz while 5G ultra-wideband may operate at frequencies of approximately 28 GHz and 39 GHz.

While the original carrier 110 is moving through the transmission process, at least one transpositional modulation (TM) channel 130 is added to the original carrier 110, thereby generating a TM fortified carrier 140 with signal. As shown in FIG. 1, the TM channel 130, or TM mods, includes a second quantity of data 132. When the TM channel 130 is added to the original carrier 110 to form the TM fortified carrier 140, the first quantity of data 112 of the original carrier 110 and the second quantity of data 132 of the TM channel 130 are both included in the TM fortified carrier 140. The first and second quantities of data 112, 132 may remain separate within the TM fortified carrier 140, or be combined in whole or part. When the at least one TM channel 130 and the original carrier 110 are formed into the TM fortified carrier 140, the combined signal and data remains under the spectral mask 120, such that the collective signals and data do not exceed the spectral mask 120.

It is noted that any number of TM channels 130 may be added to the original carrier 110, so long as the cumulative signal of the added TM channels 130 with the original carrier 110 remains within the spectral mask 120. For instance, the TM signal may be demodulated to be orthogonal to a matched filter used for a waveform of the signal of the original carrier 110. In FIG. 1, two TM channels 130 are depicted being added to the original carrier 110. It is possible to only include one TM channel, or to include a plurality of TM channels 130, as may be dependent on the system and its intended use. The TM channel or channels 130 added may utilize sidebands or lobes within the original waveform of the spectral mask 120, such that they remain within the spectral mask 120. This allows the sidebands of the original waveform to be used for communication purposes beyond that traditionally used with the original carrier 110, which increases the usable bandwidth within the spectral mask 120. As such, it is possible to transmit a larger quantity of data within the spectral mask 120 using the TM channels 130 in comparison to conventional techniques using only an original carrier 110 or using non-TM modulation.

The fortified TM carrier 140 may then be sent through the network 150 to an end destination. For instance, the network 150 may include various antennas 152 which are used to transmit fortified TM carrier 140 signals. Other network devices may also be used. One or more electronic or computerized devices 160, such as computers, smart phones, or similar electronics may be connected to the network 150 and receive the fortified TM carrier 140, where all or part of the data within the fortified TM carrier 140 can be decoded and received. One benefit of the system 100 is the superior quality of experience that the user of the electronic device 160 achieves, in data transmission speed, increased bandwidth, and increased security and/or privacy.

With regards to increased data transmission speed and bandwidth, the utilization of the TM channel 130 on the sidebands of the spectral mask 120 allows for the ability to include a larger quantity of data than using only the original carrier 110, since additional data can be transmitted within the TM channels 130 without detracting from the bandwidth of the original carrier 110. This effectively increases the overall bandwidth that is usable within the spectrum. In turn, this can be used to transmit more data at a given time than has been conventionally used within a given spectral mask 120, thereby providing increased transmission speeds. In mobile networks, such as with 5G bandwidths using less spectrum, the system 100 can provide a multifold increase in bandwidth out of an existing mobile network operator's spectrum. For instance, in some situations, the system 100 can effectively double the bandwidth in an existing network.

While a conventional receiver of the electronic device 160 may be capable of receiving the first quantity of data 112 of the original carrier 110, it is not capable of receiving the second quantity of data 132 of the TM channel 130. This is because conventional (non-TM) receivers are not capable of deciphering the data within the TM channel 130, since these conventional receivers identify this data as noise, and thus ignore this data. Accordingly, it is possible to utilize this characteristic of conventional receivers to effectively secure or obfuscate the second quantity of data 132 within the TM channel 130 from devices 160 which only utilize conventional, non-TM receivers.

However, when the device 160 includes a TM-receiver, e.g., a receiver capable of receiving and identifying data transmitted within a TM channel 130, it is possible for the device 160 to successfully recognize the second quantity of data 132 within the TM channel 130 and thus receive it. In other words, a TM-receiver is capable of identifying that the second quantity of data 132 which is transmitted within the TM channel 130 is not noise, where the TM-receiver decodes the second quantity of data 132 instead of ignoring it. In this way, it is possible to use the TM channel 130 for the transmission of data which requires heightened security, privacy, or otherwise is desired to be kept from being received by a device 160 with only a conventional receiver. For example, it may be possible to send null signals within the first quantity of data 112 of the original carrier 110, while important or sensitive data is sent within the second quantity of data 132 of the TM channel 130.

This technique can be used to provide secure communications which meets or exceeds the security required by various industries or organizations, such as, for example, the strict privacy requirements of electronic healthcare records, security requirements of the financial industry, or security requirements of the Department of Defense (DOD). For the DOD specifically, the system 100 can achieve covert level security such as zero trust architecture (ZTA), where secure communication is achieved using TM on detection (TMOD), which enables DOD level security to mobile networks.

While TM offers improvements over conventional signal transmission, there is a need to manage network traffic with TM signals to ensure there is efficient and uninterrupted service. For instance, for TM signals communicated through multiple different networks, there is often a need to steer, switch, or split the signal to, from, or between different access network points. These network points may be within various network communication protocols and systems, such as 5G, 4G, WiFi, satellite, or others. Managing the network traffic throughout the TM communication system may help ensure that the mode of access for transmitting the TM signal is selected and that there is seamless handover between different networks.

To address traffic management with TM signals, various traffic management systems and methods may be employed. For instance, FIG. 2 is a diagrammatical illustration of the system for transpositional modulation fortified communication of FIG. 1 with a traffic management module, in accordance with embodiments of the present disclosure. Referring to FIG. 2, the original carrier 110 is provided with one or more TM channels 130 to form the TM fortified carrier 140, as previously described in FIG. 1. The TM fortified carrier 140 may be processed through a traffic management module 170, which, in one example, may operate similar to a traditional ATSSS technique, in that, it may utilize a rules engine to modify, direct, or otherwise alter the signal or signals of the TM fortified carrier 140. In particular, the traffic management module 170 may direct the TM fortified carrier 140 through the network 150 and to a user device 160 (FIG. 1).

As is known in the field, the 3rd Generation Partnership Project (3GPP) release 16 (Rel 16) introduced ATSSS (Access traffic steering, switching, and splitting) which allows user traffic steering across multiple access technologies such as 5G, 4G, WiFi, Wireless, Satellite etc., at a finer granularities than a PDU session, which has been used to provide connectivity between applications on user equipment (UE) and a data network (DN) such as the Internet or private networks. ATSSS introduces a multi-access PDU session, a PDU session for which the data traffic can be served over one or more concurrent accesses such as trusted 3GPP and non-3GPP access, and untrusted non-3GPP access.

In the system 100, the network 150 may be separated into a plurality of subnetworks, such as a first network 150A, a second network 150B, and a third network 150C, which are representative of three data paths. It is noted that any number of subnetworks may be included within the system 100, including fewer or greater than the three subnetworks depicted in FIG. 2, so long as all subnetworks are within the spectrum. Each of the subnetworks 150A-150C may operate as a data path through which data within the TM fortified carrier 140 can be transmitted.

3GPP provides for network splitting within the main waveform, but this requires additional network IDs and effectively remains a single network within the original carrier. The system 100, in contrast, can add additional networks through the use of TM, which increases the usable space within the spectrum, such that additional networks with optionally different parameters can be utilized. It is further noted that each of the subnetworks 150A-150C may be separated into further subnetworks. For instance, each of the subnetworks 150A-150C may become three 5G networks, when traditional ATSSS is overlaid on the system 100.

The system 100 may utilize the subnetworks 150A-150C to transmit different parts of the TM fortified carrier 140 signal in different subnetworks 150A-150C, thereby allowing for selective control of the network path for a particular type of signal data. For instance, as discussed relative to FIG. 1, with multiple data paths, where the first and second quantities of data 112, 132 are transmittable along different paths from one another, such that the original carrier signal data can be transmitted along a different subnetwork from that of the data within the TM channel 130.

It can be beneficial for the subnetworks 150A-150C to have different parameters which are configured to provide different data transmission benefits. For instance, network 1 150A can offer faster data transmission speeds, while network 2 150B can offer different privacy protocols, while network 3 150C can provide different security protocols. A user or wireless operator can then use these different parameters of the subnetworks 150A-150C to provide adjustable or tailored use based on a desired type of enhancement. For example, a user who desires faster transmission speeds but does not need increased security or privacy can be directed to network 1 150A, while a user who desired heightened privacy can be directed to network 3 150C. The subnetworks 150A-150C can effectively be used to provide dynamic wireless communications to users based on the user's own preference.

As an example, a global network, such as AT&T® or Verizon®, can utilize this network splitting by providing one main network (network 1) for standard wireless communication, but then offer certain customers improved data transmission through other subnetworks (network 2 or network 3). For instance, network 2 or network 3 could be used for local networks, while network 1 is a global network, or network 2 and network 3 could be used for secure communications utilized by commercial or governmental customers where enhanced security is provided, such as through the aforementioned obfuscation techniques. This system 100 can be used to generate increased revenue for network operators by providing enhanced data transmission networks to customers willing to pay more for these services. These so-called 'local edge' communications can be avenues for new revenue generation by enabling localized data communications on the mobile edge of the spectrum.

Figure 3:
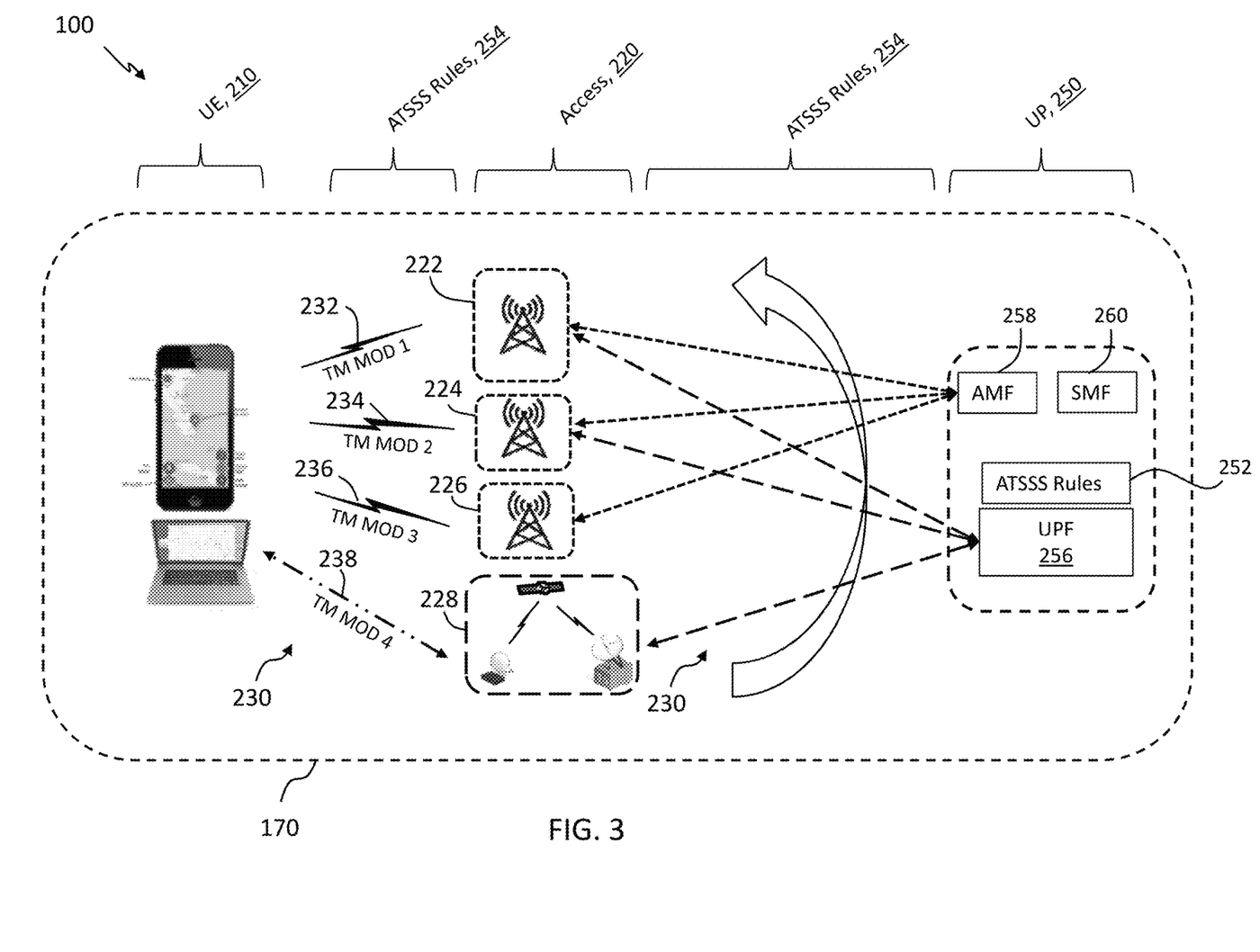
FIG. 3 is a diagrammatical illustration of the traffic management module of the system for transpositional modulation fortified communication of FIGS. 1-2, in accordance with embodiments of the present disclosure.

Improvements over conventional ATSSS which are provided by the traffic management module 170 may be understood relative to FIG. 3, which is a diagrammatical illustration of the traffic management module 170 of the system for transpositional modulation fortified communication of FIGS. 1-2, in accordance with embodiments of the present disclosure. The traffic management module 170 can be characterized as a device or unit which is capable of steering a wireless signal, such as by steering the signal between different access points or access paths to achieve the best network selection. The traffic management module 170 can also switch the signal between the access points or paths, such as between 5G NR, 4G, WiFi, or satellite, among others, thereby providing seamless handover of the signal. It is also possible for the traffic management module 170 to split the signal between communication protocols or access paths, such as between 5G and WiFi to achieve network aggregation.

In these examples, the traffic management module 170 is described relative to various access points or access paths, which are communication protocols which may operate differently from one another. For instance, the access points may include 5G, 5G NR, 4G, WiFi, and satellite communication protocols, among other communication protocols not explicitly referenced herein. While conventional ATSSS systems are typically used to steer, switch, or split a signal to achieve an improved wireless signal transmission using only WiFi and 5G, the traffic management module 170 may be used to advantageously split the signal of the TM fortified carrier into both different data paths within a single communication protocol of the network itself, and/or between different access points beyond 5G and WiFi. The traffic management module 170 may have the ability to choose which access points to use, versus traditional ATSSS splitting between 5G and WiFi, where both mediums are used.

Conventional ATSSS systems typically steer, split, or switch between only 5G and WiFi, but the traffic management module 170 of the system 100 can utilize TM, as previously described, which uses the outer bands of the spectrum such that it is possible to utilize only one access point, e.g., 5G networks, without the need for splitting between two or more access points. TM enables 5G Rel 16 ATSSS features without sacrificing original waveform bandwidth by adding additional waveforms to the bandwidth. This creates multiple subnetworks in addition to, for example, a main operator global PLMN network. Additional subnetworks can be used to create localized small networks, and hence, introduce integrated global-local networks by using 3GPP ATSSS features.

As depicted in FIG. 3, the traffic management module 170 of the system 100 may manage network traffic using TM modified signals. The process may be understood relative to different components or aspects of the overall network, including the user equipment (UE) 210, which includes any type of user computing or communication device, such as smart phones, computers, laptop devices, tablets, networking equipment, personal electronic devices, smart watches, or any other similar electronic communication device. Communication signals from the UE 210 may be transmitted between two or more locations through one or more access points 220, which may include a 5G network 222, a 4G network 224, a WiFi network 226, a satellite network 228, or another communication network. Accordingly, the signals 230 communicated between the UE 210 and the access points 220 may correspond to the type of access point 220 which is receiving or sending the signals, for example, 5G NR signals 232, 4G signals 234, WiFi signals 236, or satellite signals 238, as shown in FIG. 3.

In the example of FIG. 3, the 5G NR access point 222 and the 4G access point 224 may be within the 3GPP standard, whereas WiFi access point 226 and the satellite access point 228 may be non-3GPP access points. For instance, the WiFi access point 226, or WLAN (802.11), may be implemented as non-3GPP Silvus & WiFi network which uses Silvus MANET systems with 5.8 UNI Bands, S, C & L Bands, which is considered a non-3GPP which is trusted. The satellite access point 228 may be a non-3GPP DRS-Satellite & WiFi access point, which uses a satellite system with low delay, such as low Earth orbit (LEO) satellite. The satellite access point 228 may be providing either Backhaul or Access via Wireline, which is considered a non-3GPP-DRS, which, for example, could be supplying Starlink LEO Satellite system use.

Each of the signals 232-238 may be implemented in a TM modified signal which is added to the conventional signals communicated within the spectrum of a particular access point, as discussed relative to FIGS. 1-2, where the data communicated is transmitted within a TM signal within the outer bands of the spectrum. Accordingly, each of the signal paths to the access points 220 may be understood as TM modified signals, e.g., TM MOD 1 corresponding to the 5G signal 232, TM MOD 2 corresponding to the 4G signal 234, TM MOD 3 corresponding to the WiFi signal 236, and TM MOD 4 corresponding to the satellite signal 238. Other TM modified paths may also be used for other communication protocols, and/or additional TM modified paths can also be used for the same protocols, as may be dependent on the design, implementation, and use of the system 100.

From the access points 220, the system 100 communicates the signals to the user plane (UP) module 250 which carries network user traffic. The UP 250 may be generally composed of a data plan, a control plan, and a management plane, which work together to manage and carry telecommunication traffic. The UP 250 may enable both 3GPP and non-3GPP access operations for the user equipment 210. As shown in FIG. 3, the UP 250 includes an access traffic steering and splitting rules module 252 which may be a rules engine that is capable of modifying, directing, or otherwise altering the signal or signals 230 communicated between the UE 210 and the access points 220. As such, the access traffic steering and splitting rules module 252 may determine, implement, or execute one or more specific access traffic steering and splitting rules 254 to control, direct, or otherwise manage the transmission path of the signals 230 to and/or from the access points 220. The access traffic steering and splitting rules module 252 may be operated in a computerized device where a computer processor executed the access traffic steering and splitting rule 254. The access traffic steering and splitting rules module 252 may be capable of steering the signals 230 to one or more access points 220, whereby according to service, the best access point 220 can be selected to allow for efficient and uninterrupted user-plane traffic, switching the signals 230 between access points 220, e.g., performing handover without service interruption to the other access point 220 when necessary, or splitting the signal 230 between access points 220, e.g., simultaneously using or two or more access points 220 for a signal 230.

The access traffic steering and splitting rules 254 may be implemented during signal transmission between the access points 220 and the UP 250, whereby the traffic of the TM modified signals 230 may be managed by switching, steering, or splitting the signals 230, as needed, between the various access points 220 and the UP 250, whereby the signals 230 move in both directions through the selected mode of access. For example, the signals 230 which are transmitted through the satellite access point 228 may be directed to a user plane function module 254 which manages the connections of the data between networks, such as between area networks and the Internet. Depending on the access traffic steering and splitting function, the signals 230 may also be transmitted through the 5G access point 222, the 4G access point 224, or another access point. Signals 230 which are not transmitted through the satellite access point 228, may be directed to an access and mobility management function (AMF) module 258. The AMF module 258 may receive connection requests and forward session management requirements over an interface, e.g., a N11 interface, to a session management function (SMF) module 260. The AMF module 258 may perform most of the functions that a mobility management entity (MME) performs, and may determine which function of the SMF module 260 may be best positioned or suited to handle the connection request.

As can be seen, the traffic management module 170 may be able to conduct access traffic steering and splitting with TM modified signals in ways that improve over the conventional use of ATSSS. For instance, the traffic management module 170 can operate with numerous access points 220 which are beyond the capabilities of conventional ATSSS, traditionally only using 5G and WiFi networks. Additionally, because the signals are within TM modified signals, there is increased bandwidth within each of the transmitted signals, due at least in part to the use of the outer bands of the spectrum. Moreover, as discussed previously, the use of TM modified signals allows for increased security in many situations, and/or for the ability to utilize different signal paths for different entities or purposes.

Figure 4:
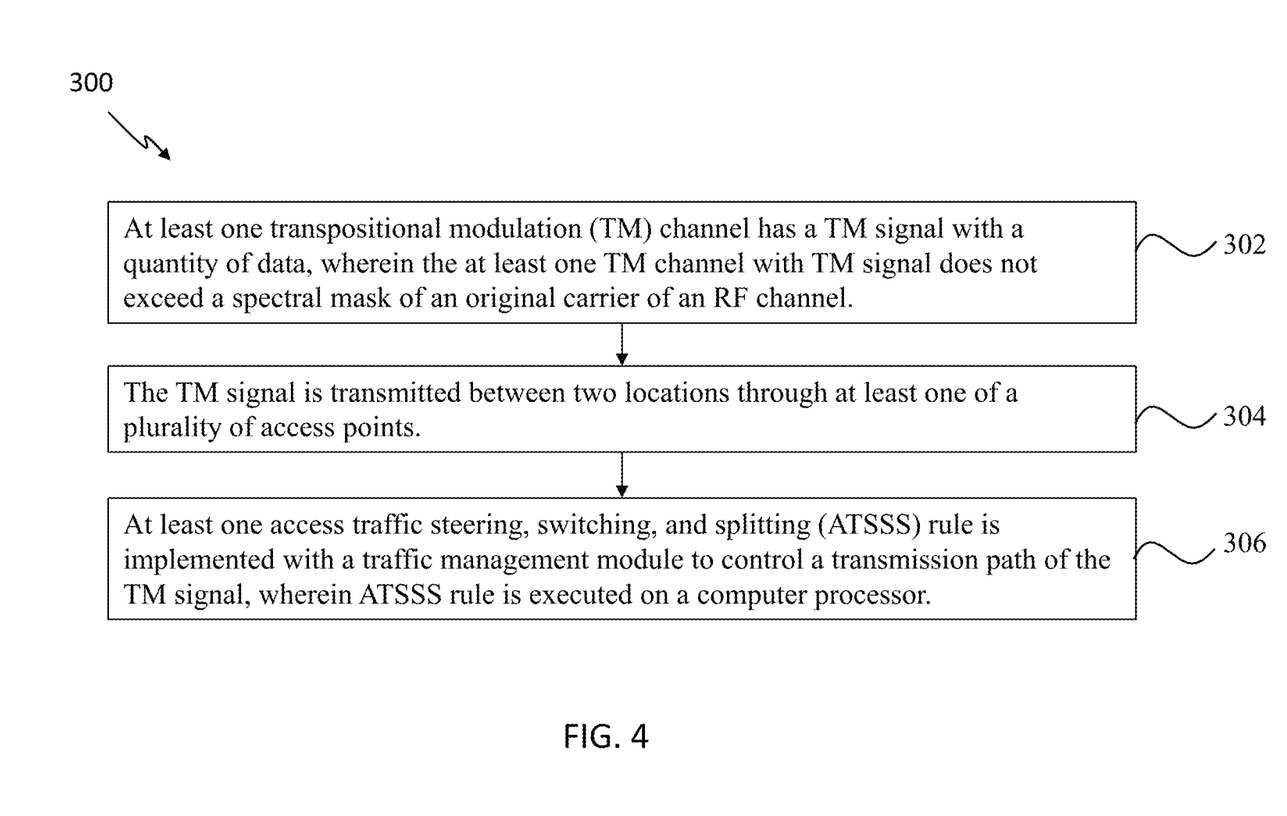
FIG. 4 is a flowchart illustrating a method of traffic management of transpositional modulation fortified communications, in accordance with embodiments of the present disclosure.

FIG. 4 is a flowchart 300 illustrating a method of traffic management of transpositional modulation fortified communications, in accordance with embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, at least one transpositional modulation (TM) channel has a TM signal with a quantity of data, wherein the at least one TM channel with TM signal does not exceed a spectral mask of an original carrier of an RF channel. The TM signal is transmitted between two locations through at least one of a plurality of access points (block 304). At least one access traffic steering and splitting rule is implemented with a traffic management module to control a transmission path of the TM signal, wherein access traffic steering and splitting rule is executed on a computer processor (block 306). Any number of additional steps, functions, processes, or variants thereof may be included in the method, including any disclosed relative to any other figure of this disclosure.

Figure 5:
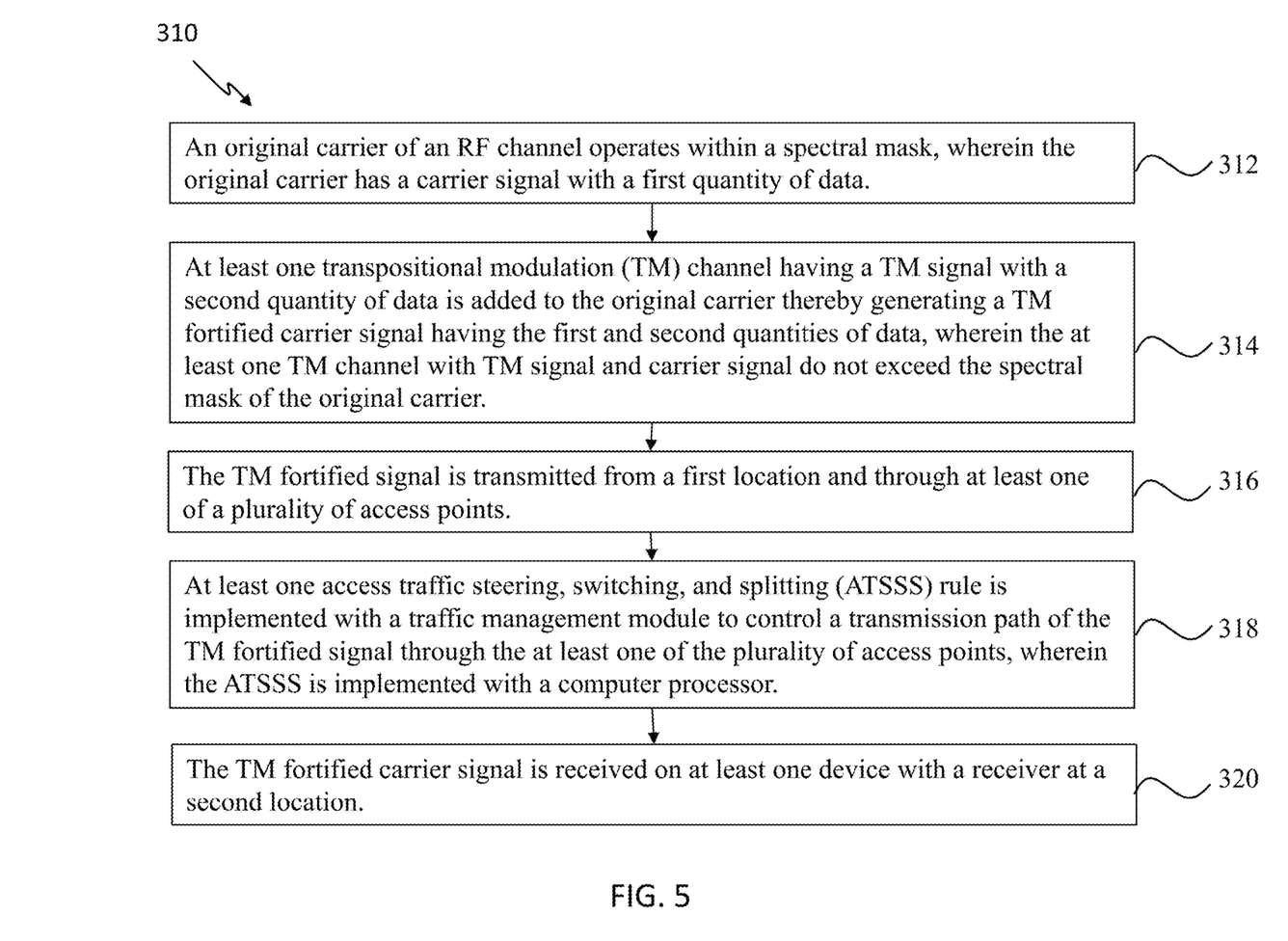
FIG. 5 is a flowchart illustrating a method of traffic management of transpositional modulation fortified communications, in accordance with embodiments of the present disclosure.

FIG. 5 is a flowchart 310 illustrating a method of traffic management of transpositional modulation fortified communications, in accordance with embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 312, an original carrier of an RF channel operates within a spectral mask, wherein the original carrier has a carrier signal with a first quantity of data. At least one transpositional modulation (TM) channel having a TM signal with a second quantity of data is added to the original carrier thereby generating a TM fortified carrier signal having the first and second quantities of data, wherein the at least one TM channel with TM signal and carrier signal do not exceed the spectral mask of the original carrier (block 314). The TM fortified signal is transmitted from a first location and through at least one of a plurality of access points (block 316). At least one access traffic steering and splitting rule is implemented with a traffic management module to control a transmission path of the TM fortified signal through the at least one of the plurality of access points, wherein the access traffic steering and splitting rule is implemented with a computer processor (block 318). The TM fortified carrier signal is received on at least one device with a receiver at a second location (block 320). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for traffic management of transpositional modulation fortified communication comprising:
    at least one transpositional modulation (TM) channel having a TM signal with a quantity of data, wherein the at least one TM channel with TM signal does not exceed a spectral mask of an original carrier of an RF channel;
    a plurality of access points, wherein the TM signal is transmitted between two locations through at least one of the plurality of access points; and
    a traffic management module implementing at least one access traffic steering and splitting rule, wherein a transmission path of the TM signal is, at least in part, controlled by the at least one access traffic steering and splitting rule.

2. The system of claim 1, wherein the at least one TM channel utilizes sidebands within the spectral mask.

3. The system of claim 1, wherein the plurality of access points includes at least one of: a 5G access point, a 4G access point, a WiFi access point, or a satellite access point.

4. The system of claim 1, wherein the plurality of access points includes: a 5G access point, a 4G access point, a WiFi access point, and a satellite access point.

5. The system of claim 1, wherein the TM signal is transmitted between at least one of the plurality of access points and a user plane module.

6. The system of claim 4, wherein the user plane module includes an access traffic steering and splitting rules module, wherein the access traffic steering and splitting rules module implements the at least one access traffic steering and splitting rule.

7. The system of claim 1, wherein the TM signal is received at a receiver, wherein:
    when the receiver comprises a non-TM receiver, wherein the quantity of data is obfuscated; and
    when the receiver comprises a TM receiver, the quantity of data received is not obfuscated.

8. A method for traffic management of transpositional modulation fortified communications, the method comprising:
    providing at least one transpositional modulation (TM) channel having a TM signal with a quantity of data, wherein the at least one TM channel with TM signal does not exceed a spectral mask of an original carrier of an RF channel;
    transmitting the TM signal between two locations through at least one of a plurality of access points; and
    implementing at least one access traffic steering and splitting rule with a traffic management module to control a transmission path of the TM signal, wherein the at least one access traffic steering and splitting rule is executed on a computer processor.

9. The method of claim 8, wherein the at least one TM channel utilizes sidebands within the spectral mask.

10. The method of claim 8, wherein the plurality of access points includes at least one of: a 5G access point, a 4G access point, a WiFi access point, or a satellite access point.

11. The method of claim 8, wherein the plurality of access points includes: a 5G access point, a 4G access point, a WiFi access point, and a satellite access point.

12. The method of claim 8, further comprising transmitting the TM signal between at least one of the plurality of access points and a user plane module.

13. The method of claim 12, wherein the user plane module includes an access traffic steering and splitting rules module, wherein the access traffic steering and splitting rules module implements the at least one access traffic steering and splitting rule.

14. The method of claim 8, further comprising the step of receiving the TM signal with a receiver, whereby:
the quantity of data is obfuscated when the receiver comprises a non-TM receiver; and
the quantity of data received is not obfuscated when the receiver comprises a TM receiver.

15. A method for traffic management of transpositional modulation fortified communications, the method comprising:
providing an original carrier of an RF channel operating within a spectral mask, wherein the original carrier has a carrier signal with a first quantity of data;
adding at least one transpositional modulation (TM) channel having a TM signal with a second quantity of data to the original carrier thereby generating a TM fortified carrier signal having the first and second quantities of data, wherein the at least one TM channel with TM signal and carrier signal do not exceed the spectral mask of the original carrier;
transmitting the TM fortified signal from a first location and through at least one of a plurality of access points;
implementing at least one access traffic steering and splitting rule with a traffic management module to control a transmission path of the TM fortified signal through the at least one of the plurality of access points, wherein the at least one access traffic steering and splitting rule is implemented with a computer processor; and
receiving the TM fortified carrier signal on at least one device with a receiver at a second location.

16. The method of claim 15, wherein the at least one TM channel utilizes sidebands within the spectral mask.

17. The method of claim 15, wherein the plurality of access points includes at least one of: a 5G access point, a 4G access point, a WiFi access point, or a satellite access point.

18. The method of claim 15, wherein the plurality of access points includes: a 5G access point, a 4G access point, a WiFi access point, and a satellite access point.

19. The method of claim 15, further comprising transmitting the TM fortified signal between at least one of the plurality of access points and a user plane module, wherein the user plane module includes an access traffic steering and splitting rules module, wherein the access traffic steering and splitting rules module implements the at least one access traffic steering and splitting rule.

20. The method of claim 15, wherein:
the quantity of data is obfuscated when the receiver comprises a non-TM receiver; and
the quantity of data received is not obfuscated when the receiver comprises a TM receiver.

* * * * *